UNITED STATES PATENT OFFICE.

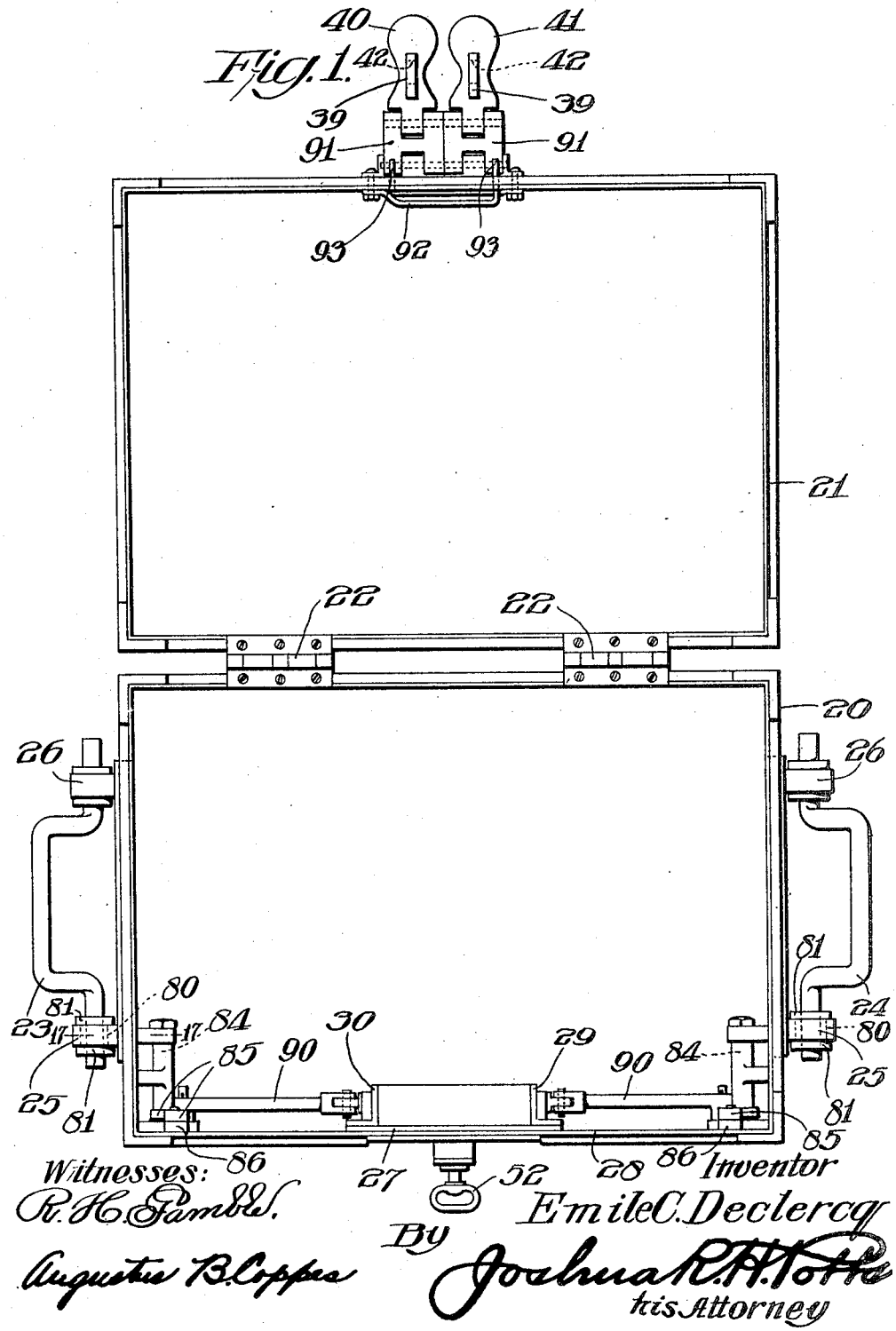

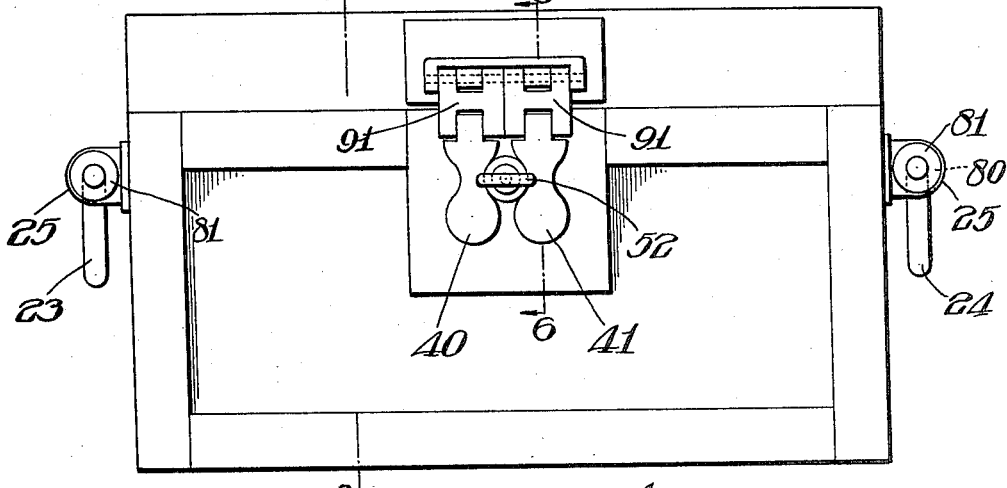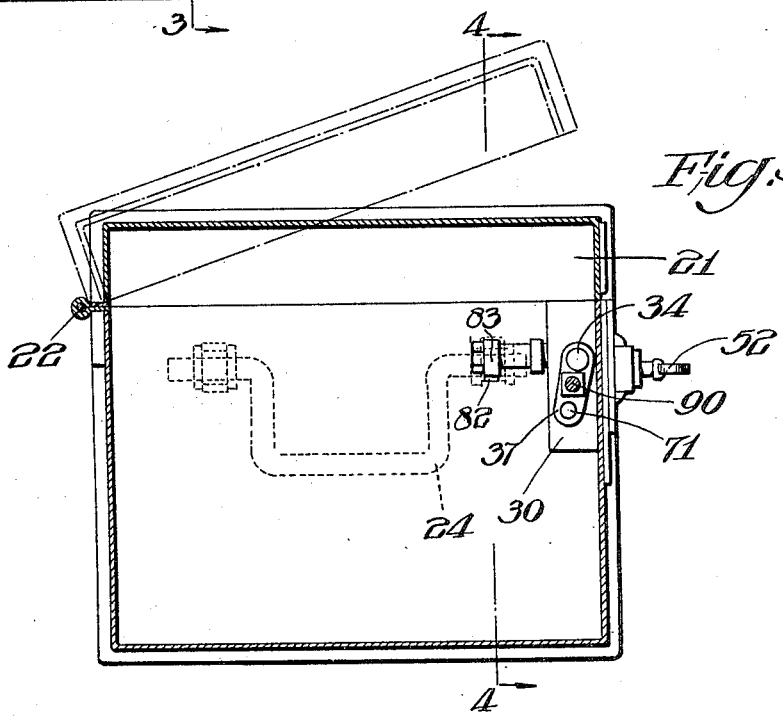

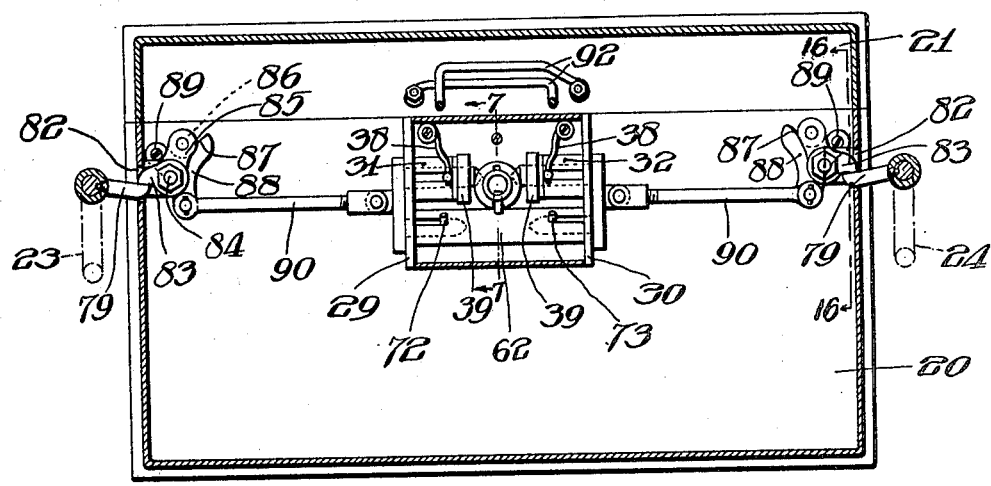
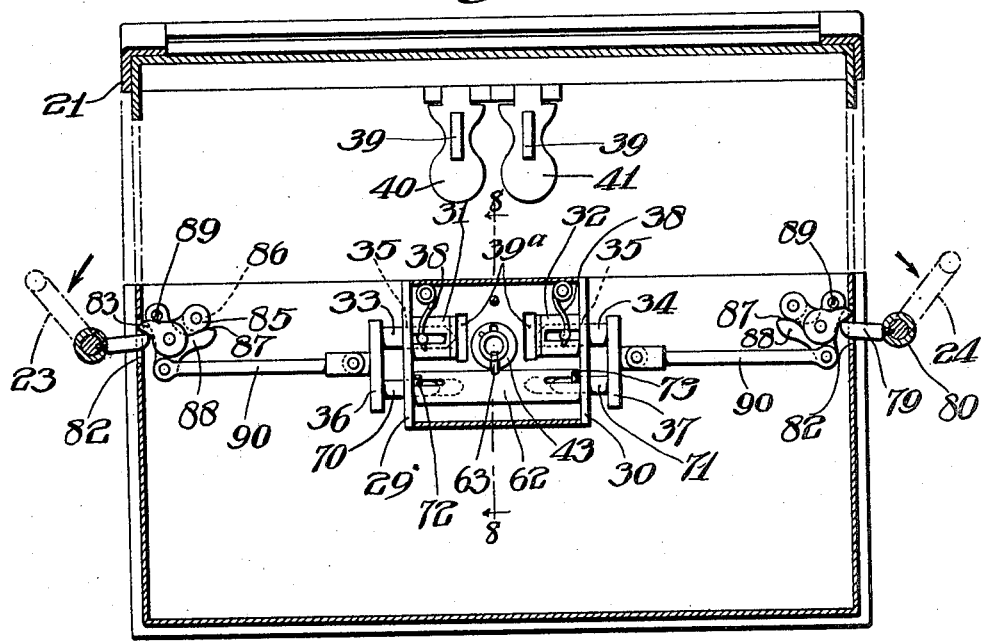

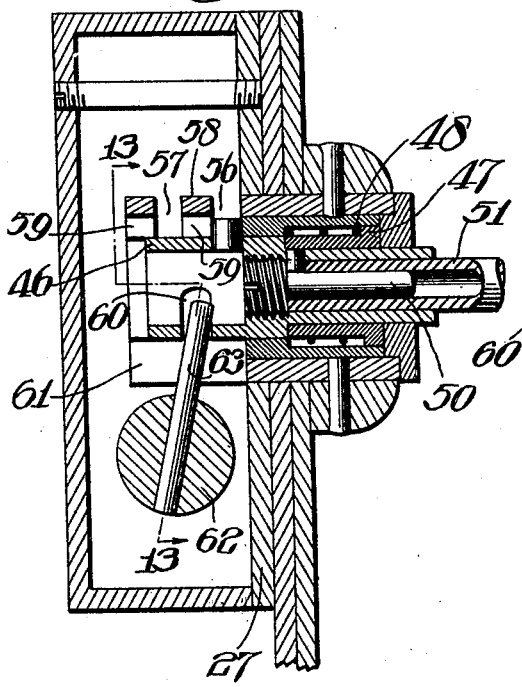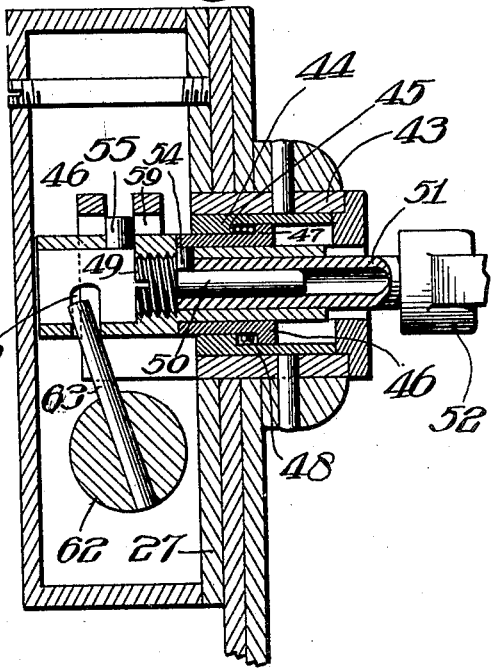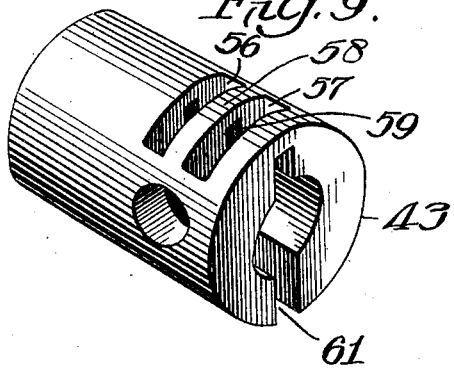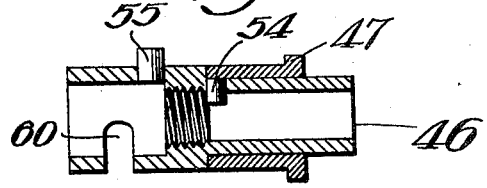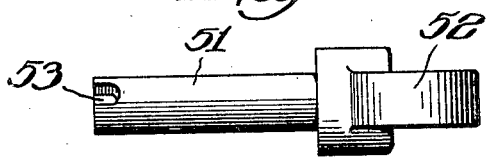

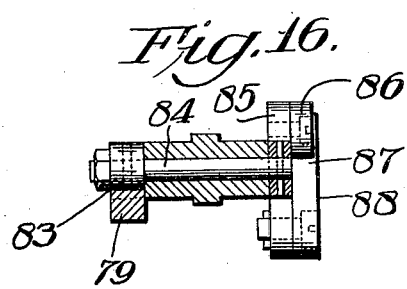

EMILE C. DECLERCQ, OF PHILADELPHIA, PENNSYLVANIA.

BOX-LOCKING MECHANISM.

1,324,341.  Specification of Letters Patent.  Patented Dec. 9, 1919.

Application filed July 8, 1919. Serial No. 309,502.

*To all whom it may concern:*

Be it known that I, EMILE C. DECLERCQ, a citizen of the United States, residing at Philadelphia, in the county of Philadelphia and State of Pennsylvania, have invented certain new and useful Improvements in Box-Locking Mechanism, of which the following is a specification.

One object of my invention is to provide improved box locking mechanism which will be so constructed that it will securely lock a box and will require the manipulation of a key and additional means in order to unlock the same.

Another object is to so construct my invention that even though a person has the proper key it will be impossible to unlock the mechanism unless the person is familiar with the character of the necessary operation of the key and said means.

These objects, and other advantageous ends which will be described hereinafter, I attain in the following manner, reference being had to the accompanying drawings in which—

Figure 1 is a top plan view of a box, with the lid open, showing my improved locking mechanism attached thereto, Fig. 2 is a front elevation of the box shown in Fig. 1 with the lid in its closed and locked position, Fig. 3 is a transverse section taken on the line 3—3 of Fig. 2, Fig. 4 is a longitudinal section taken on the line 4—4 of Fig. 3 when the lid is in its locked position, Fig. 5 is a section taken on the line 4—4 of Fig. 3 when the lid is open as shown in dot-and-dash lines in Fig. 3, Fig. 6 is a fragmentary section taken on the line 6—6 of Fig. 2, Fig. 7 is an enlarged section taken on the line 7—7 of Fig. 4, Fig. 8 is a section taken on the line 8—8 of Fig. 5, Fig. 9 is a perspective view of a guiding bushing which forms a part of my invention, Fig. 10 is a central longitudinal section of an actuating sleeve which forms a part of my invention, Fig. 11 is a top plan view of a key which forms a part of my invention, Fig. 12 is a perspective view, partly in section, showing an assembled group of certain of the elements of my invention, Fig. 13 is a sectional elevation taken on the line 13—13 of Fig. 7 showing certain of the parts in outside view and drawn on a reduced scale, Fig. 14 is a fragmentary perspective view showing one of two notched retaining sleeves which form a part of my invention, Fig. 15 is a perspective view of a rocking tube which forms a part of my invention, Fig. 16 is a fragmentary section taken on the line 16—16 of Fig. 4, Fig. 17 is a transverse section taken on the line 17—17 of Fig. 1 showing the parts in an inoperative position, Fig. 18 is a view of similar nature to Fig. 17 showing the parts in a position ready to be operated by a movement of a handle, and Fig. 19 is a fragmentary perspective view of a clutch portion of one of the handles.

Referring to the drawings, 20 represents the body portion of a box having a lid 21 hinged thereto at 22. The body portion 20 has handles 23 and 24, the free ends of which are rotatably mounted in bearings 25 and 26 which are riveted or otherwise secured to the body portion 20. A plate 27 is secured to the inner surface of the front section 28 of the box body 20 and has two substantially parallel flanges 29 and 30 which project inwardly as clearly shown in Figs. 1, 4 and 5. Two housings 31 and 32 are secured to the plate 27 between the flanges 29 and 30 and these housings form slideways for two bolts 33 and 34, said bolts entering said housings through holes 35 in the flanges 29 and 30 and being connected at their outer ends to cross heads 36 and 37. The inner free ends of the bolts 33 and 34 are adapted to be moved toward each other by springs 38. The front section 28 of the box body and the plate 27 have slots 39ª to permit tongues 39, on hasps 40 and 41 which are pivotally secured to the lid 21, to enter said box body, said tongues 39 having holes 42 therein whereby the bolts 33 and 34 will enter the holes 42 and thereby lock the lid to the body portion under certain conditions hereinafter described.

A substantially cylindrical guiding bushing 43 is secured to the plate 27 and extends into the box body 20. This bushing 43 has a collar 44 secured therein, said collar having an internally extending flange 45 which forms a bearing for an actuating sleeve 46, said actuating sleeve having a flange 47 as clearly shown in Figs. 7, 8 and 10. A coiled spring 48 is interposed between the flanges 44 and 47 so that said spring normally holds the actuating sleeve 46 in the position shown in Fig. 7. The sleeve 46 has a rod 49 screwed therein, said rod having an outer end portion 50 of smaller diameter than the diameter of the actuating sleeve 46 to permit the barrel 51 of an actuating key 52 to slide therein, said barrel 51 having a notch 53 for embracing a pin 54 which extends into the actuating sleeve 46. It will thus be noted that by inserting the key 52, the sleeve 46 will be pushed inwardly against the action of the spring 48 and when the key is rotated the actuating sleeve will also be rotated. The actuating sleeve 46 has a second pin 55 projecting therefrom; said pin 55 being adapted to enter either of two arcuate slots 56 and 57 so as to prevent the actuating sleeve from being moved inwardly or outwardly under conditions hereinafter described. The partition 58 (see Figs. 7, 8 and 9) has a notch 59 to permit the pin 55 to pass from one of the slots 56 and 57 into the other when the proper key is inserted. However, by turning the actuating sleeve 46, the pin 55 will be moved in either of the slots 56 or 57 out of alinement with the notch 59 and thereby will lock the actuating sleeve against inward or outward movement.

The actuating sleeve 46 has an arcuate slot 60 and the guiding bushing 43 has a longitudinally extending slot 61. A rocking tube 62 has a pin 63 which is adapted to extend into the slot 60 of the actuating sleeve 46 through the longitudinal slot 61 in the guiding bushing 43. Two retaining sleeves 64 and 65 are secured to the plate flanges 29 and 30, and the rocking tube 62 has its opposite ends rockably mounted on said retaining sleeves 64 and 65, as clearly shown in Figs. 12 and 13. The retaining sleeves 64 and 65 have slots 66 and 67 with offset portions 68 which provide shoulders 69. Pintles 70 and 71 are rotatably secured in the cross heads 36 and 37 and slide within the retaining sleeves 64 and 65. These pintles 70 and 71 have lugs 72 and 73 which extend outwardly through the respective slots 66 and 67 in the retaining sleeves 64 and 65 and also extend through slots 74 and 75 in the rocking tube 62. The spring 48 normally tends to move the actuating sleeve 46 outwardly and this action rocks the rocking tube 62 so as to hold the lugs 72 and 73 in the offset portions 68 of the slots 66 and 67 so that it is impossible to move the cross heads 36 and 37 apart and the bolts 33 and 34 are thereby secured in their locked positions within the tongues of the hasps 40 and 41. By pushing the actuating sleeve 46 inwardly the rocking tube 62 will be rocked and the lugs 72 and 73 will be pushed out of the offset portions 68 and it is then possible to separate the cross heads 36 and 37 for example as shown in Fig. 5 and thereby withdraw the bolts 33 and 34 from the tongues of the hasps.

The cross heads 36 and 37 are operatively connected to the handles 23 and 24, by mechanism now to be described, so that when the actuating sleeve has been pushed inwardly and turned so as to lock the pin 55 within the slot 57, the handles by being moved into a certain position can be used as levers for moving the cross heads 36 and 37 apart to withdraw the bolts from the hasp tongues.

Each of the handles 23 and 24 has one of its end portions reduced in diameter to provide an annular groove 76 (see Figs. 16 to 19 inclusive). Longitudinal grooves 77 extend from the grooves 76 toward one end and when the handles are swung upwardly into the position shown in Fig. 18 and in dot-and-dash lines in Fig. 5, the handle can be moved lengthwise in order to cause the grooves 77 to engage the ends 78 of actuating fingers 79, said actuating fingers being secured within collars 80 which are rotatable within the bearings 25, said collars having side flanges 81 positioned at opposite sides of the bearings. The fingers 79 project into the box body through holes 82 and engage cams 83 on rock shafts 84. The rock shafts have arms 85 provided with anti-friction rollers 86 which enter recesses 87 in levers 88, said levers being pivoted at 89 to the box body and have their lower ends pivotally connected to links 90, said links being pivoted to the cross heads 36 and 37.

The hasps 40 and 41 are both pivoted to hinge plates 91, said hinge plates being in turn hinged to the lid 21 so that when the lid is moved into a closed position the hasps can accommodate themselves in a position to permit the tongues to freely enter the holes 39ᵃ so as to be engaged by the bolts 33 and 34.

Wire springs 92 are secured to the inner part of the lid 21 and have free ends 93 which extend through holes in the lid and engage the plates 91 of the hasps and serve to move the hasps away from the lid so as to withdraw the tongues 39 from the holes 39ᵃ when the bolts are released.

Considering that the tongues 39 are locked by the bolts 33 and 34 and that the handles are in a position so that the ends 78 of the actuating fingers 79 are positioned within the grooves 76 of the handles so that the handles are free to hang downwardly as shown in Fig. 4, if it is desired to unlock the box the key 52 is inserted so as to push the actuating sleeve 46 from the position shown in Fig. 7 to the position shown in Fig. 8. The key is then turned so as to move the pin 55 out of register with the notch 59 and thus lock the actuating sleeve 46 in its inner position. It will be noted that by thus pushing the actuating sleeve inwardly, the rocking tube 62 will be rocked so as to push the lugs 72 and 73 out of the offset portions 68 into line with the slots 66 and 67. The cross heads 36 and 37 are then free to be moved apart to cause the withdrawal of the bolts 33 and 34. This action takes place in the following manner: The handles 23 and 24 are swung from the position shown in Fig. 4 into the position shown in Fig. 5. After being thus swung the handles are moved longitudinally to cause the ends 78 of the fingers 79 to enter the grooves 77; thus rotatably locking the handles to the fingers 79. After this action has taken place the handles are then swung downwardly which causes the fingers 79 to raise the cams 83 and thereby rock the shafts 84. This movement is imparted to the levers 88 and the links 90 will be moved in opposite directions to move the cross heads 36 and 37 apart. Since the bolts 33 and 34 are attached to the cross heads they will be withdrawn from the tongues 39 and the springs 92 will move the hasps away from the lid so as to cause the tongues to be withdrawn from the holes 39ª.

By locking the actuating sleeve in its innermost position, a person has both hands free to simultaneously move the handles 23 and 24 to withdraw the bolts.

It will be noted that when the actuating sleeve 46 is in its outer or normal position as shown in Fig. 7 that it is impossible to withdraw the bolts for the reason that the lugs 72 and 73 are within the offset portions 68 of the slots 66 and 67 and therefore are in abutment with the shoulders 69 and can not be moved until they are pushed out of the offset portions 68 by the rocking movement of the tube 62.

From the foregoing description it will be understood that the locking means within the box is released by selective means, such for example as the key 52, and is afterward unlocked by independent manually operative means located on the outside of the box. Thus to open a box equipped with my improved box mechanism it is not only necessary for a person to have the proper key and necessary to understand how to operate that key in order to release the locking mechanism and to hold the same in a released position, but it is necessary for the person to understand how the handles are to be manipulated in order to move the locking means, after having been released, to unlock the box.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a box having a body portion and a lid having a part adapted to enter said box, of locking means including a bolt for locking engagement with said part of the lid within the box; means for retaining said bolt in a locked position; selective means for moving said retaining means to release said bolt; a handle normally adapted to swing without effecting the movement of said bolt; and means operatively connected to said bolt and coöperative with said handle when the latter is moved in a direction transverse to the swinging movement thereof to operatively connect said handle with the bolt whereby when the handle is swung while in said latter position the bolt will be released from said part of the lid to permit the opening thereof; substantially as described.

2. The combination with a box having a body portion and a lid provided with a part adapted to enter said box; of a bolt for locking engagement with said part; independent means located on the outside of said box and operatively connected to said bolt within the box; a pintle rotatably connected to said bolt; a lug on said pintle; a fixed retaining sleeve having a slot provided with an offset portion forming a shoulder; means for normally holding said lug in said offset portion whereby said shoulder prevents movement of said bolt through the medium of said pintle; and selective means operative to move said lug out of said offset portion whereby the pintle can be moved to free said bolt of said part of the lid by movement of said independent means; substantially as described.

3. The combination with a box having a body portion and a lid provided with a part adapted to enter said box; of a bolt for locking engagement with said part; independent means located on the outside of said box and operatively connected to said bolt within the box; a pintle rotatably connected to said bolt; a lug on said pintle; a fixed retaining sleeve having a slot provided with an offset portion forming a shoulder; a rocking tube rotatably surrounding said retaining sleeve and having a slot through which said lug extends; a guiding bushing having arcuate slots spaced apart and providing a partition between said arcuate slots, said partition including a notch; an actuating sleeve having a pin adapted to enter either of said arcuate slots when moved lengthwise, said pin entering either of said slots through the notch in said partition; and a pin on said tube and adapted to be moved by said lengthwise movement of the actuating sleeve whereby the tube will be rocked to cause said lug to be moved into and out of said offset portion of the slot in said retaining sleeve, said independent means being operative when said lug is moved out of said offset portion of the retaining sleeve to slidably move said bolt out of engagement with said part of the lid; substantially as described.

4. The combination with a box having a body portion and a lid provided with a part adapted to enter said box; of a bolt for locking engagement with said part; independent means located on the outside of said box and operatively connected to said bolt within the box; a pintle rotatably connected to said bolt; a lug on said pintle; a fixed retaining sleeve having a slot provided with an offset portion forming a shoulder; means for normally holding said lug in said offset portion whereby said shoulder prevents movement of said bolt through the medium of said pintle; selective means operative to move said lug out of said offset portion whereby the pintle can be moved to free said bolt of said part of the lid by movement of said independent means, said independent means including a handle; an actuating finger detachably connected to said handle; a link operatively connected to said bolt; and a cam operatively connected to said link and adapted to be moved by said finger when said handle is operatively connected to said retaining finger; substantially as described.

5. The combination with a box having a body portion and a lid provided with a part adapted to enter said box; of a bolt for locking engagement with said part; independent means located on the outside of said box and operatively connected to said bolt within the box; a pintle rotatably connected to said bolt; a lug on said pintle; a fixed retaining sleeve having a slot provided with an offset portion forming a shoulder; a rocking tube rotatably surrounding said retaining sleeve and having a slot through which said lug extends; a guiding bushing having arcuate slots spaced apart and providing a partition between said arcuate slots, said partition including a notch; an actuating sleeve having a pin adapted to enter either of said arcuate slots when moved lengthwise, said pin entering either of said slots through the notch in said partition; and a pin on said tube and adapted to be moved by said lengthwise movement of the actuating sleeve whereby the tube will be rocked to cause said lug to be moved into and out of said offset portion of the slot in said retaining sleeve, said independent means being operative when said lug is moved out of said offset portion of the retaining sleeve to slidably move said bolt out of engagement with said part of the lid, said actuating sleeve being rotatable to cause said pin thereof to move, within said arcuate slots, out of alinement with the notch of said partition; substantially as described.

6. The combination with a box having a body portion and a lid provided with a part adapted to enter said box; of a bolt for locking engagement with said part; independent means located on the outside of said box and operatively connected to said bolt within the box; a pintle rotatably connected to said bolt; a lug on said pintle; a fixed retaining sleeve having a slot provided with an offset portion forming a shoulder; a rocking tube rotatably surrounding said retaining sleeve and having a slot through which said lug extends; a guiding bushing having arcuate slots spaced apart and providing a partition between said arcuate slots, said partition including a notch; an actuating sleeve having a pin adapted to enter either of said arcuate slots when moved lengthwise, said pin entering either of said slots through the notch in said partition; a pin on said tube and adapted to be moved by said lengthwise movement of the actuating sleeve whereby the tube will be rocked to cause said lug to be moved into and out of said offset portion of the slot in said retaining sleeve, said independent means being operative when said lug is moved out of said offset portion of the retaining sleeve to slidably move said bolt out of engagement with said part of the lid, said actuating sleeve being rotatable to cause said pin thereof to move, within said arcuate slots, out of alinement with the notch of said partition; and a key operative to move said actuating sleeve lengthwise and to turn said sleeve whereby the pin thereof can be moved into either of said arcuate slots; substantially as described.

7. The combination with a box having a body portion and a lid provided with a part adapted to enter said box; of a bolt for locking engagement with said part; independent means located on the outside of said box and operatively connected to said bolt within the box; a pintle rotatably connected to said bolt; a lug on said pintle; a fixed retaining sleeve having a slot provided with an offset portion forming a shoulder; a rocking tube rotatably surrounding said retaining sleeve and having a slot through which said lug extends; a guiding bushing having arcuate slots spaced apart and providing a partition between said arcuate slots, said partition including a notch; an actuating sleeve having a pin adapted to enter either of said arcuate slots when moved lengthwise, said pin entering either of said slots through the notch in said partition; a pin on said tube and adapted to be moved by said lengthwise movement of the actuating sleeve whereby the tube will be rocked to cause said lug to be moved into and out of said offset portion of the slot in said retaining sleeve, said independent sleeve being operative when said lug is moved out of said offset portion of the retaining sleeve to slidably move said bolt out of engagement with said part of the lid, said actuating sleeve being rotatable to cause said pin thereof to move, within said arcuate slots, out of alinement with the notch of said partition; a key operative to move said actuating sleeve lengthwise and to turn said sleeve whereby the pin thereof can be moved into either of said arcuate slots; and a spring for moving said actuating sleeve in a lengthwise direction opposite to the direction of lengthwise movement of said latter sleeve by said key; substantially as described.

In testimony whereof I have signed my name to this specification in the presence of two subscribing witnesses.

EMILE C. DECLERCQ.

Witnesses:
HENRI STAELEN,
CHAS. E. POTTS.